May 18, 1926.
B. F. MUSSER
CHEESE CUTTER
Filed Sept. 26, 1924    2 Sheets-Sheet 1
1,585,259
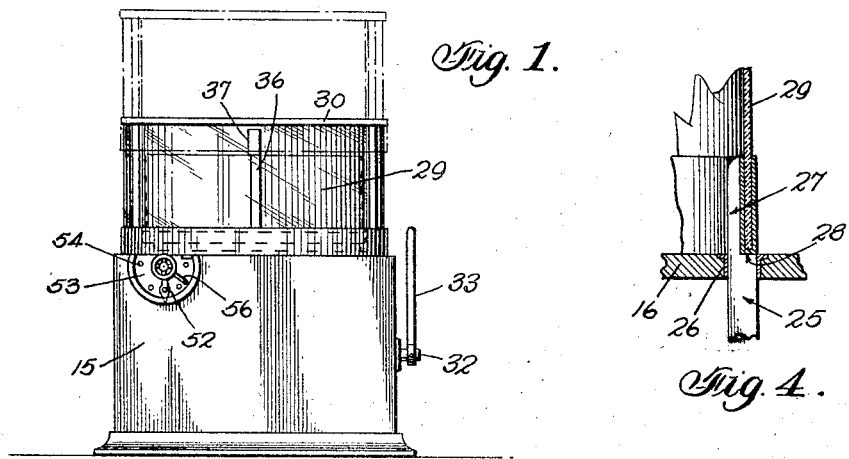
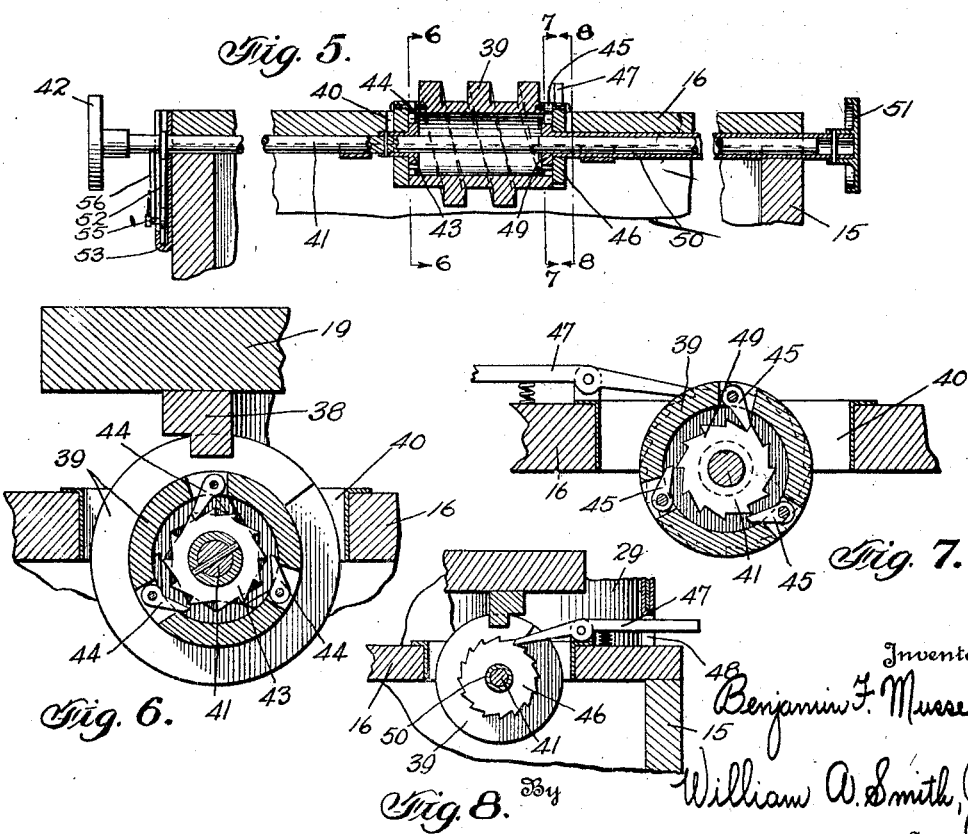
Inventor
Benjamin F. Musser,
By William A. Smith, Jr.
Attorney May 18, 1926.

B. F. MUSSER

CHEESE CUTTER

Filed Sept. 26, 1924

1,585,259

2 Sheets-Sheet 2

Inventor:-
Benjamin F. Musser,
By William A. Smith, Jr.
Attorney

Patented May 18, 1926.

1,585,259

UNITED STATES PATENT OFFICE.

BENJAMIN F. MUSSER, OF RISON, ARKANSAS, ASSIGNOR OF NINETY-ONE ONE HUN-DREDTHS TO DAVE CASH, OF RISON, ARKANSAS.

CHEESE CUTTER.

Application filed September 26, 1924. Serial No. 740,123.

My present invention relates generally to cheese cutters, and more particularly to a cheese cabinet having a transparent cover by means of which the cheese is normally protected and still displayed in full view, the cheese cutting arrangement acting to simultaneously elevate the cover with the cutting of the section of the cheese so that the cut section can be conveniently and easily removed, and my object among others in the provision of a cabinet of this character is to promote strength, durability, sightliness and convenience, and a further object is the provision of an arrangement whereby sections of previously calculated weight may be quickly cut and any unwarranted movement of the cutter adjusting means readily rectified or compensated for.

With these general objects in mind, the further and more specific objects of my invention as well as the resulting advantages thereof will be apparent from the following description, reference being had to the accompanying drawings which illustrate the invention and form a part of this specification. In these drawings, Figure 1 is a side elevation of the complete cabinet, Figure 2 is a vertical sectional view taken centrally therethrough.

Figure 2:
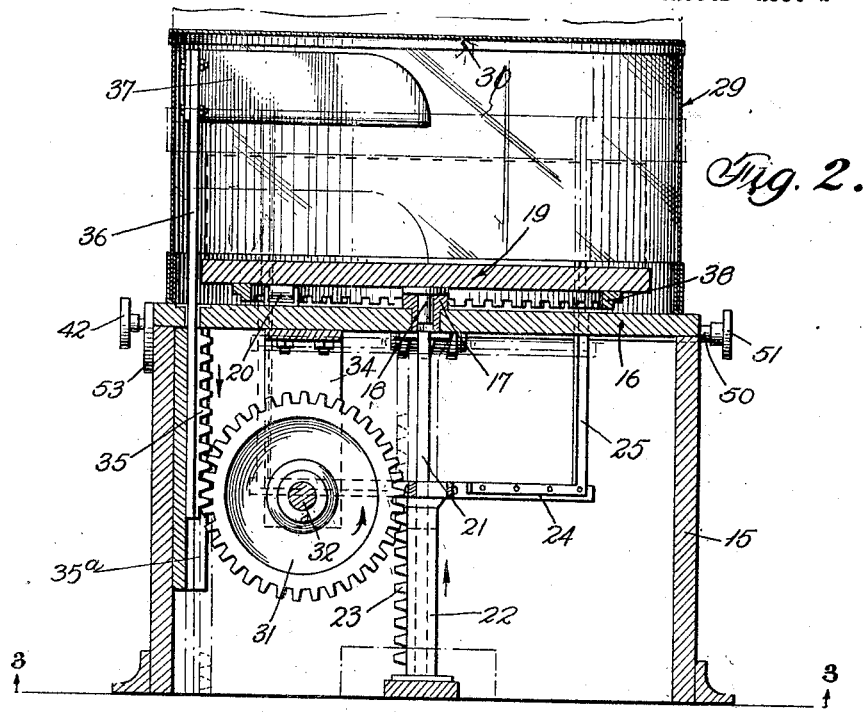
Figure 3:
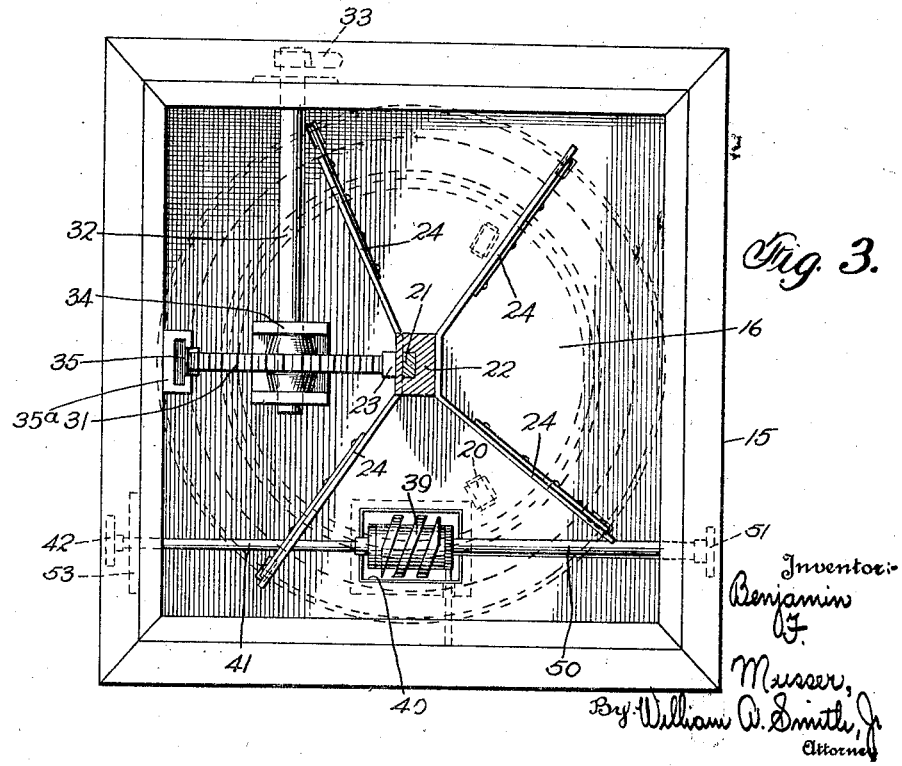

Figure 3 is a horizontal section taken therethrough substantially on line 3—3 of Figure 2, Figure 4 is a vertical detailed section taken through a portion of the cabinet top and the adjacent lower edge of the cover.

Figure 5 is a vertical section through the upper portion of the cabinet on a line with the table adjusting shaft, and Figures 6, 7 and 8 are detail vertical sections taken respectively on lines 6—6, 7—7 and 8—8 of Figure 5.

Referring now to these figures my invention proposes a cheese cutting and display apparatus including a cabinet 15 having closed sides and a top, the latter indicated at 16 and provided with a central tubular bearing piece 17 receiving the axial depending bearing pin 18 of a cheese holding turntable 19, spaced above the cabinet top 16 by virture of said central bearing member and a series of bearing rollers 20 on the cabinet top.

Rising centrally through the cabinet 15 is a vertical guide post 21 and slidable on this guide post is an adjustable upright 22 provided at one side with a vertical rack 23 and having at its top a series of outstanding arms 24 to which are connected the lower portions of upright cover supporting arms 25. The upper portions of these arms work through openings in the cabinet top 16, and preferably through guide thimbles 26 in the cabinet top as best seen by reference to Figure 4, the upper ends of each of the cover supporting arms 25 having reduced extensions 27 forming outer upwardly presented shoulders 28 which receive thereagainst the lower edge of a cover 29.

The cover just above referred to and as best seen in Figures 1 and 2 is preferably cylindrical in form with a transparent annular wall and a top 30 and is of course of sufficient height to enclose a cheese resting on the turntable 19, with the lower edge of the cover 29 engaging the upper surface of the cabinet top 16 whereby the cheese will be thoroughly covered and protected and at the same time within full view through the transparent wall.

The rack 23 of the adjustable upright 22 is engaged by a gear 31 mounted upon the inner end of a cross shaft 32, one end of which projects externally through the wall of the cabinet 15 as plainly seen in Figure 1 and has secured thereto one end of an operating handle 33 whereby when the handle is swung downwardly from its normal upstanding position rotation will be imparted to the gear 31 and the adjustable upright 22 will be elevated in order that the cover supporting arms 25 may shift the cover 29 upwardly to the position shown in dotted lines in Figure 1 thus permitting the operator to easily reach the cheese on the turntable 19.

The shaft 32 has bearing in a bracket 34 depending from the top 16 of the cabinet and the gear 31, at a point diametrically opposite to the rack 23, engages another rack 35 formed on the lower portion of a vertically shiftable cutter bar 36, said cutter bar and rack being confined and guided in its vertical movements by a suitable bracket 35ª rigidly secured to the inner side of the cabinet 15. The upper portion of this bar projects through the cabinet top 16 beyond the peripheral edge of the turntable 19 and within the cover 29 and has secured to its upper end a horizontally extending cheese cutting blade 37 whose free end is alined substantially above the axis of the turntable so that simultaneous with the elevation of the cover 29 to the open position, the cheese cutting blade will be forced downwardly in a line truly radial with respect to the cheese and with the latter positioned with its axis in alinement with the axis of the turntable. In this way slices of cheese will be cut and it is obvious that the thickness and weight of the slices will depend upon the rotative adjustment of the table between cutting operations. It is furthermore obvious that by measured rotation of the turntable between cutting operations uniform slices of predetermined weight may be successively cut and to this end I propose a mechanism for the rotative adjustment of the turntable the extent of movement of which may be easily controlled so as to cut quarter pound, half pound or pound sections of the cheese as may be desired.

The lower surface of the turntable 19 has a circular rack 38 and this rack is engaged by a worm 39 which projects slightly above the surface of the cabinet top 16 through an opening 40 in the cabinet top as seen in Figure 3. The worm 39 is mounted loosely around a shaft 41 journaled through and across the cabinet immediately beneath the top 16 at one side of the center of the cabinet as is plain from reference to Figures 1 and 3, the shaft having upon one end a handle in the form of a wheel 42 and having secured thereon within and adjacent to one end of the worm 39 a ratchet wheel 43. For this purpose and for a reason to be presently made plain the worm 39 is hollow and is provided adjacent to one end with a series of dogs 44 in engagement with the ratchet wheel 43 whereby rotative movement of the shaft 41 in one direction will be imparted to the worm 39 resulting in turning movement of the turntable 19 while rotative movement of the shaft 41 in the opposite direction will simply result in rotation of the shaft with respect to the worm in view of the sliding movement of the dogs 44 over the teeth of the ratchet wheel 43.

The hollow worm 39 is also provided adjacent to its opposite end with a series of dogs 45 turned opposite with respect to the dogs 44, these latter dogs 45 being adjacent to a ratchet wheel 46 secured to one end of the worm 39 and engaged by a dog 47 pivoted on the cabinet top 16 as shown in Figure 8 and is spring controlled so that the worm may be rotated in one direction corresponding to advancing or feed movement of the turntable 19 and will ordinarily be prevented from rotation in a reverse direction. It will be noted, however, from Figure 8 that one end of the dog 47 projects beyond the cover 29 when the latter is in lowermost or closed position through a notch 48 in the cover so that it is a simple matter to manually force the dog 47 out of engagement with the teeth of the ratchet wheel 46, thus freeing the worm 39 for rotation in either direction.

The dogs 45 of the hollow worm engage the teeth of a ratchet wheel 49 as seen in Figures 5, 6 and 7, the teeth of which ratchet wheel are turned oppositely with respect to the teeth of the ratchet wheel 43. This ratchet wheel 49 is formed upon one end of a sleeve 50 disposed around that portion of the shaft 41 lying upon the opposite side of the worm 39 with respect to the shaft handle 42, the outer end of the sleeve 50 extending beyond the respective end of the shaft and being provided with a handle in the form of a wheel 51.

In this manner by the use of the handle 42, the adjusting shaft 41 may be rotated in one direction only, corresponding to the desired advancing feed movement of the turntable 19 but inasmuch as it sometimes happens through careless or unwarranted manipulation by others, the turntable is advanced beyond the desired point, it is obvious that it thus becomes very desirable to reverse movement of the turntable. To do this the operator presses the dog 47 free of the ratchet wheel 46 and then grasps handle 51 of the sleeve 50 so that upon movement of this handle the worm 39 may be rotated to reverse the feed movement of the turntable or in other words return the latter to the desired point where feed movements may be again started.

In order that measured portions of the cheese may be cut according to previous calculation taking into consideration the diameter of the particular cheese of the turntable, the shaft 41 is provided adjacent to its handle 42 with a gauge arm 52, which is loose thereon and shiftable across the gauge plate 53 secured to the side of the cabinet 15, the gauge plate having an arcuate series of openings 54 and the gauge arm having a stop pin or screw 55 which may be positioned in a selected opening 54. Likewise the shaft 41 has adjacent to the gauge arm 52 a stop arm 56 so disposed that when the stop pin 55 of the gauge arm is mounted in one of the openings 54 of the gauge plate 53, the said stop pin will be disposed in the outward swinging movement of the stop arm when the shaft 41 is rotated. By previously calculating the movement of the adjusting shaft required to bring sufficient of the cheese beneath the knife blade for the cutting of say a quarter of a pound of cheese therefrom, it is obvious that by correspondingly positioning the gauge arm, all that is necessary is to rotate the shaft handle 42 in a counter-clockwise direction until the stop arm moves upwardly to the limit of its movement in one direction and then rotate the handle clockwise until the stop arm strikes the stop pin. If a half a pound of cheese is to be cut this operation is then repeated and if a pound of cheese is desired four feed movements are required. On the other hand it is of course to be understood that the adjustment may in the first instance be made for feed movements corresponding to a half a pound of cheese and as the operator soon becomes familiar with such matters, any position of the cheese except that in which it is supposed to be at the time is easily detected and may be corrected through the use of the turntable reversing connections just above described.

It becomes obvious from the foregoing that my invention provides a cabinet which thus permits of the display of cheese in an effectively covered protected manner as well as one which permits the cutting and sale of the cheese in an expeditious manner, the cheese being uncovered simultaneously with the cutting thereof so that each cut section may be readily removed.

The cabinet proposed by my invention for this purpose is strong and durable and at the same time simple and inexpensive when the results are taken into consideration.

I claim:

1. A device of the character described including a cabinet, a cheese holder rotatable on the cabinet, a cover around the cheese holder having a transparent wall, a vertically shiftable knife bar working through the cabinet top, having a cheese cutting blade at its upper end above the holder, a series of cover supporting arms around the holder working through the cabinet top and having shouldered upper ends on which the lower edge of the cabinet rests, a vertically shiftable upright within the cabinet having connection with said cover supporting arms, and means for simultaneously shifting said upright and said knife bar in relatively opposite directions whereby to cut cheese on the holder and at the same time elevate the cover.

2. A device of the character described including a cabinet, a cheese holder rotatable on the cabinet, a cover around the cheese holder having a transparent wall, a vertically shiftable knife bar working through the cabinet top, having a cheese cutting blade at its upper end above the holder, a series of cover supporting arms around the holder working through the cabinet top and having shouldered upper ends on which the lower edge of the cover rests, a vertically shiftable upright within the cabinet having connection with said cover supporting arms, said upright and the lower portion of said knife bar having racks in opposing spaced relation, a gear engaging said racks at diametrically opposite points, a shaft on which said gear is secured, having its outer portion projecting exteriorly of the cabinet, and an actuating arm on the projecting end of said shaft.

3. A device of the character described including a cabinet, a rotatable cheese holder on the cabinet having a lower circular rack, a shaft through the cabinet, a worm gear on the shaft engaging said rack, a handle at one end of the shaft, a gauge plate on the cabinet adjacent to said handle, a gauge member adjustable on the plate, and a stop arm carried by the shaft for movement against the gauge member, said worm gear being loose on the shaft and having a series of dogs, and a ratchet wheel secured on the shaft and engaged by said dogs.

4. A device of the character described including a cabinet, a rotatable cheese holder on the cabinet having a lower circular rack, a shaft through the cabinet, a worm gear loose on the shaft intermediate its ends and engaging said rack, a ratchet connection between the shaft and the worm gear for rotating the gear in one direction, ratchet means to prevent rotation of the worm gear in the opposite direction including a dog on the cabinet, a sleeve around one end of the shaft having an external handle at its outer end, and a ratchet connection between the inner end of said sleeve and the worm gear for rotating the latter in the opposite direction with respect to its actuation by said shaft when the said dog is released from the said gear.

In testimony whereof I hereunto affix my signature.

BENJAMIN F. MUSSER.